Fig. 12

INVENTORS
HENRI CHIREIX
HUGUES GOUDET
BY
ATTORNEY

Patented Jan. 3, 1933

1,893,159

UNITED STATES PATENT OFFICE

HENRI CHIREIX AND HUGUES GOUDET, OF PARIS, FRANCE, ASSIGNORS TO COMPAGNIE GENERALE DE TELEGRAPHIE SANS FIL, OF PARIS, FRANCE, A CORPORATION OF FRANCE

HIGH SPEED MULTIPLEX TELEGRAPHY

Application filed July 7, 1930, Serial No. 465,968, and in France July 10, 1929.

The present invention, system Chireix-Goudet relates principally to the association of processes, arrangements and apparatuses forming a system of automatic high-speed multiplex telegraphy and, secondarily, to the elements of this combination taken by themselves.

It finds its application in wired as well as wireless communications.

It comprises an arrangement of apparatuses for the transmission and an arrangement of apparatuses for the reception of signals and insures the application of a signaling method wherein the signals are formed by emissions of equal duration but of different frequencies, otherwise small in number, each corresponding to a letter or mark.

The translation of the messages at the sending end into signals of different frequencies is accomplished with the aid of perforated bands whose perforations are obtained by means of special perforators with alphabetic key-board. The signals produced by the simultaneous passage of several perforated bands adjacent the keying means are sent into the transmitting means under the control of a distributor.

At the receiving end, the translation of the signals into the characters of the alphabet is insured at the full output speed of the connection by a photoelectric arrangement of apparatuses comprising frequency selection elements actuating two galvanometric relays of special construction with multiple equalizing positions, each corresponding to the constitutive frequency combinations of the signals.

One of the galvanometric relays insures the movement in one sense of a table of characters while the other assures the movement in another sense of a luminous pencil impinging on this table in such manner that by the combined action of these two movements the pencil can strike any one of the characters on the table.

The image of the particular letter or mark illuminated by the pencil is impressed on a sensitive photographic surface. An optical receiving distributor insures the regrouping, by messages, of the letters delivered in mixed arrangement by the signal translator.

The feeding movement, the treatment and the cutting of the photographic paper are effected by automatic devices so that the messages are delivered at the end of the machine printed in the usual characters on separate bands.

The invention is applicable to the transmission of marks of any type, or alphabets, by means of the selection of the number of compartments of the table of characters, the number of corresponding frequencies to be employed in order to form the necessary different signals and by means of the adaption of the various elements to these particular conditions.

The invention will be better understood with the aid of the attached drawings and the description pertaining thereto representing, by way of example and non-limiting, an embodiment of the invention.

Figure 13 shows more in detail one embodiment of a circuit connecting the musical frequency generators to the transmitters and to the distributor of Figure 2; while, Figure 14 shows diagrammatically the complete circuit arrangement of the receivers, their connection with the galvanometric translators, and the selective amplifiers for the "tops" or current impulses used for synchronizing the driving motor at the receiver.

The described assembly realizes twelve telegraphic channels simultaneously operated at dactylographic speed and furnishes at the receiver the completely automatic translation into printing characters on 12 independent bands.

With a striking speed of 50 words per minute, a total of 600 words per minute transmitted and received is accomplished for the 12 channels together.

Such a speed of reception is obtained photographically as will be disclosed first.

The general principle of operation will now be pointed out briefly and will commence with a brief description of the translating apparatus at the receiver.

Figures 1, 2, 3, 4, 5, 6, 7:
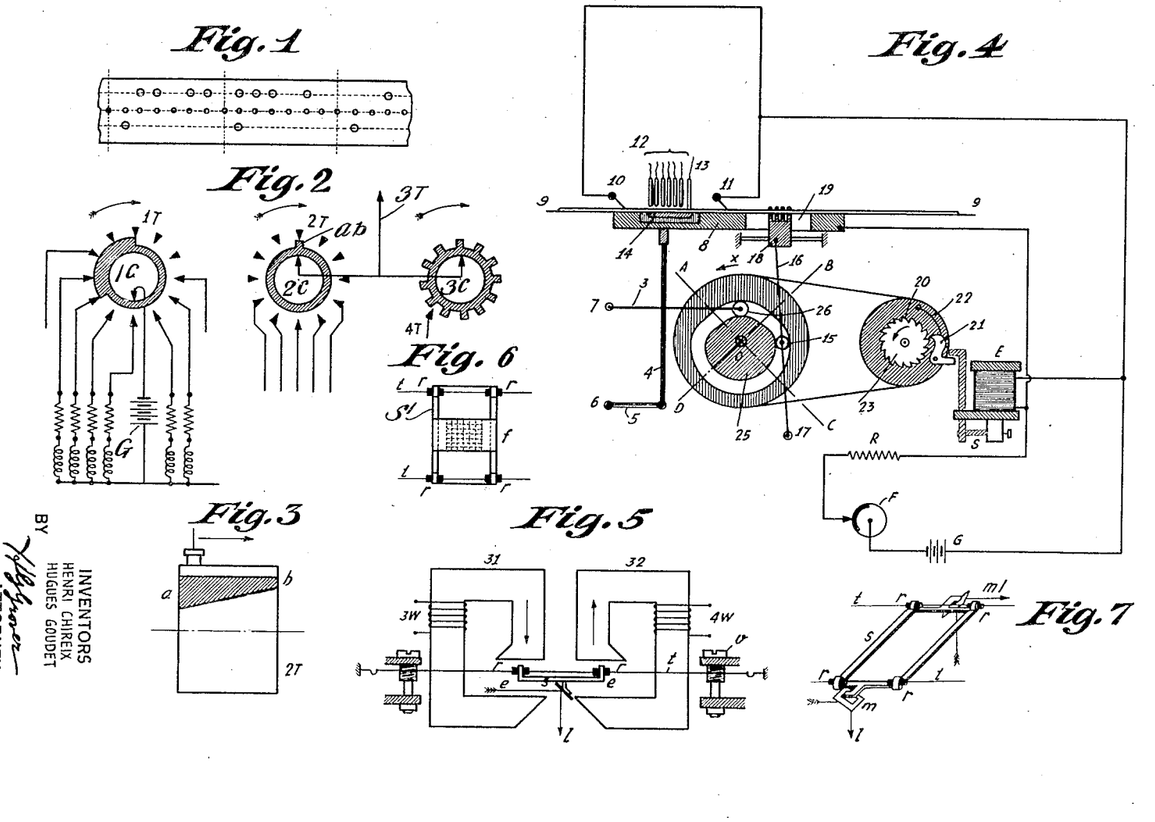
Figure 1 shows a perforated tape to be used at the transmitter.
Figure 2 shows a transmitter distributor.
Figure 3 is a detail of the contacts on the distributor of Fig. 2.
Figure 4 shows diagrammatically a transmitter keying arrangement.
Figure 5 shows applicants' novel translating mechanism.
Figure 6 shows in detail a portion of the translating means.
Fig. 7 shows in detail a portion of the translating means shown in Fig. 5.

The light transparent movable photographic film $f$ of Fig. 6 is divided into 49 sections of 1 mm. squared, each section corresponding to a character to be reproduced. This film $f$ is traversed, at the moment of the photographic exposure, by a thin luminous pencil ray which is likewise movable so that, according to the relative position of film and luminous ray, a particular section representing a particular signal character is illuminated to the exclusion of the other sections. The image of the illuminated section of the film is then projected, magnified, on a sensitive paper band $pb$ (Fig. 8) on which it makes an imprint.

Figure 8:
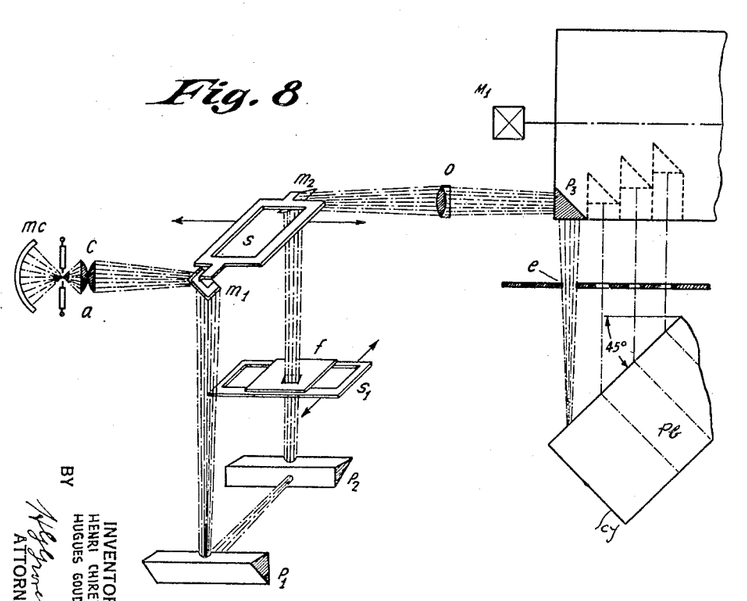
Figure 8 shows diagrammatically a means, including part of applicants' novel translator of Figure 5 for converting the energy representative of the signals into legible symbols.

The luminous ray, controlled by a first movable set S provided with two mirrors $m_1$, $m_2$, moves parallel to itself in a certain direction as illustrated in Fig. 8. The film supported by a second movable set S1, moves parallel to itself in a plane at right angles to the movement of the mirrors. The film and the luminous ray may each occupy 7 definite positions of equilibrium, 3 to the left, 1 central position of rest and 3 to the right. In this manner the 49 sections of the film are scanned.

The movements of the two movable sets S and $S_1$ are effected by two electromagnetic devices of identical principle one of which is shown in Fig. 5. These devices form the "translator". In accordance with the present invention, there is provided for each of the "translators" six definite values of control currents. The center position of each set is obtained by the zero value of control current.

If the combinations of numbers are figured, taken individually and in pairs, it is known that with 3 numbers 6 different combinations may be obtained. For example the three different characters $a, b, c$, when combined give three additional characters $ab, ac, bc$, to produce a total of 6 different characters.

More specifically, given a first group of 3 audible frequencies $a, b, c$, 3 single sounds may be realized and 3 sounds combined, with 2 frequencies, resulting in a total of 6 distinct frequencies.

With a second group of 3 other frequencies, there will be obtained likewise 6 other different combinations.

The mode of operation is as follows:

Each letter is characterized by the emission of 1, 2, 3 or 4 simultaneous acoustic frequencies, amongst the admitted 6, two of these frequencies, at the maximum, are utilized to produce the movement of the luminous ray and two others, at the maximum, to produce the movement of the film $f$.

Selective circuits insure at the reception the dissection of the combined sound into single frequencies and release, by means of valve devices which will be described in detail, the desired control currents of the two movable sets.

The arrangement of the transmitting means will now be briefly described.

Figure 13:
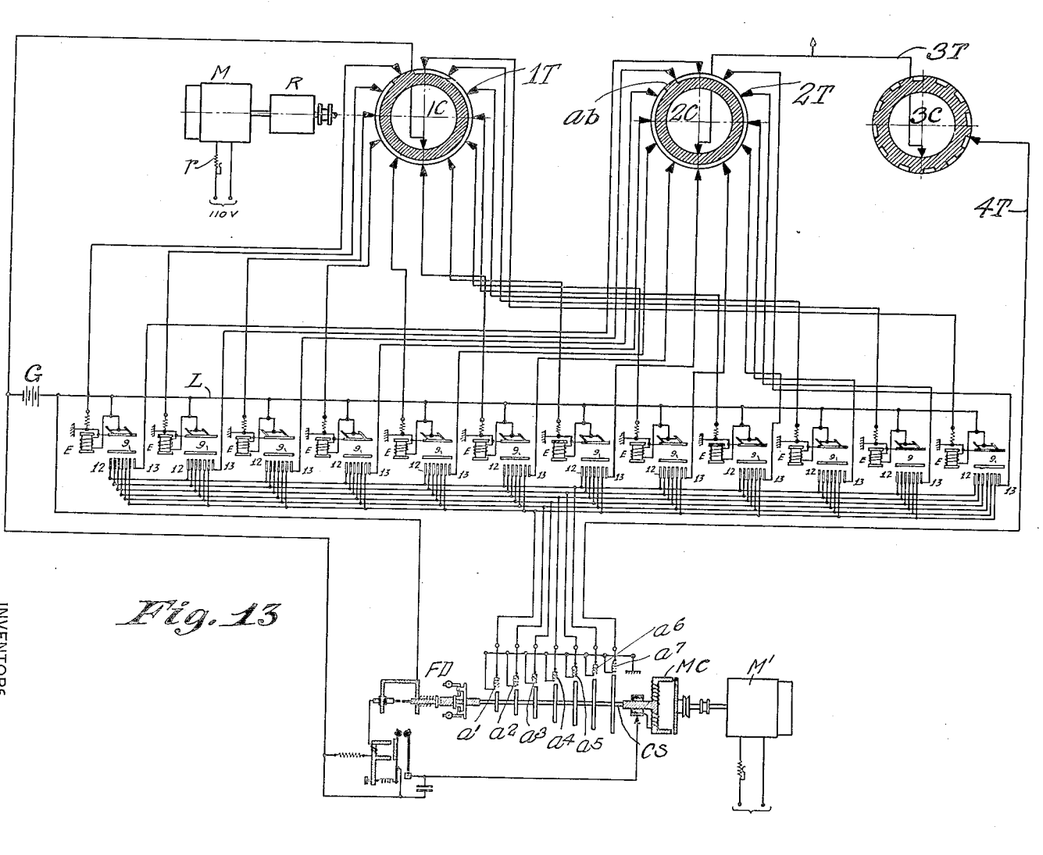

The transmission of a letter is insured by means of a "sending distributor" as shown in Figs. 2, 3 and 13 and consists in the sending of a certain combined sound, characteristic of the letter and whose duration is fixed whatever this letter may be.

This same distributor emits furthermore, during the interval between the transmission of two letters, a synchronizing signal or "top" on a 7th independent frequency.

These latter signals insure the rotation of a "receiving distributor" (Fig. 9) driven by a synchronous motor.

The operation of the receiving and translating apparatus will now be briefly described.

The reception of the signal characteristic of a letter insures the operation of the two movable sets S and $S_1$ of the translator whose inertia is sufficiently small so that the position of equilibrium is reached with the cessation of the signal. Subsequently, an electric spark, controlled by the synchronous receiving distributor, creates, during a very short time, a luminous pencil which, after reflection on one of the mirrors of the first movable set is passed through fixed prisms, to illuminate the desired section of the movable film $f$.

The image thus illuminated is taken up by the second mirror $m_2$ of the first movable set, then by the objective (Fig. 8) and finally reflected by one of the revolving mirrors of the "receiving distributor", being finally projected on the photographic band $pb$ where it makes an imprint.

Immediately after the jumping of the spark, the two movable sets of the "translator" are returned to the center position of equilibrium, this return being effected by the receiving distributor itself. With the following signal the same phenomena take place again and this, since the revolving mirrors of the receiving distributor have changed their position, in the manner that the photographic inscription will take place nearby on another band corresponding to a second channel and so forth.

In fact, for greater simplicity, use is made only of a single large band of photographic paper divided in as many lines as there are telegraphic channels.

This band, after automatic development and drying, is separated by knives in narrow bands corresponding to the twelve multiplex channels.

Coming back to the transmitting end, it may be seen that the "sending distributor" cuts-in in successive order the twelve "transmitters" corresponding to twelve simultaneous channels for the purpose of inserting, between two successive letters of a same telegram, a letter of each of the telegrams belonging to other channels.

The "transmitters" themselves function due to the passage of a paper band with special perforation, as shown in Fig. 1, so as not to limit the operators to any particular cadence.

*Characteristic features and advantages of the system*

Before entering into the description of the details and elements of the system whose general arrangement has just been discussed, the following facts may be noted:

1. From the point of view of exploitation.

(a) The course of the traffic on each telegraphic channel runs with a speed sufficiently slow that the delivery may be regular and that no waiting messages are piling up.

(b) The perforated band at the transmitting end is the deciding factor for all subsequent control.

(c) The system is adapted for repetitions, either instantaneous or differentiated, in fact this purpose is sufficed if the same band is passed through two different transmitters.

(d) The reception, being entirely automatic and continuous, requires a small operating force only.

2. From the technical point of view.

(a) A letter requires one signal only of fixed duration. This signal is relatively long, may be approximately five times longer than a Morse signal with the same speed. The length of the signals permits the use to best advantage of resonance circuits at the receiving end. This is a very important point in wireless telegraphy which insures the reduction of the effect of atmospheric strays on the received signals.

(b) The resonance may be employed on each of the transmitted acoustic frequencies and these latter may differ to a slight degree only from one another.

The total spectrum of the necessary frequencies is reduced to 1800 cycles per sec. For example the frequency band between 700 and 2500 cycles per second is sufficient for signalling in accordance with the present method. Consequently, this method does not require cables or lines with frequencies with large separation.

(c) The control currents of the translator are released by the frequency and not by the intensity of the signal received, having quite well defined independent values, that is independent of the more or less variable weakening of the transmission, in the case of wired as well as wireless communication.

These are some of the conditions which the translator should satisfy.

The translator is common to twelve multiplex circuits and must therefore have a printing speed of 600 words per minute, being 50 letters a second assuming that one word contains on the average five letters.

Accordingly, the movable sets must be able to execute 50 go and return movements, that is 100 movements in the second.

On the other hand, it is necessary that these movements are suitably damped in order to avoid all rebound and that the positions of equilibrium are quite stable.

In order to satisfy these conditions, the damping is adjusted, on the one hand, to the neighborhood of the critical aperiodicity and, on the other hand, forces are applied to the movable part of an order that they represent 500 times its weight per centimeter of displacement or 50 times per millimeter.

To this end the movable sets are imparted a very great lightness, and in order to obtain a very stable position of equilibrium, use is made exclusively, disregarding return springs, of electrodynamic forces.

These constructive rules are satisfied by the type of apparatus shown in Fig. 5 which is intended merely to illustrate the invention rather than to limit it.

A movable winding S, short-circuited and made of very thin aluminum, supports, either the two mirrors as shown in Fig. 7 or the film as shown in Figure 6. This closed winding or frame may move freely in the air gap $e$ of two pole pieces 31 and 32 as shown in Fig. 5.

Windings 3W and 4W, traversed by alternating current, magnetize the pieces 31 and 32 in opposite sense. The arrows drawn on the pole pieces indicate the direction of the respective fluxes at a given moment.

The winding S occupies a stable position when the flux covered by the former is equal to zero and it is always returned to this position of equilibrium by the currents which are naturally induced therein. This position of equilibrium is determined by the regulation of the ratio of the fluxes in 31 and 32.

If the fluxes are increased without changing the ratio, the position of equilibrium remains unchanged, but, the forces towards the return to equilibrium are increased, and the movements of S are more rapid. Thus, by increasing the value of the flux, the apparatus may be rendered more and more rapid.

On the other hand, by superimposing, in the coils 3W and 4W, a direct current on the preceding alternating current, thereby establishing a fixed field on which a changing field is superimposed, there is induced in the winding during the movements, Foucault currents which will oppose the movement and furnish the necessary damping.

Hence the natural frequency of the arrangement is regulated and also the damping thereof by influencing the absolute value of the alternating current and direct current. This is true even if the positions of equilibrium are defined solely by the ratio of the alternating current intensities traversing the coils 3W and 4W.

Thus are realized, in simple and completely electric manner, all the conditions required for a galvanometric structure. Furthermore, in order to render the windings S and $S_1$ sufficiently thin and of a resistance, negligible in comparison to its reactance, a fairly high frequency is chosen for the alternating current, for instance a frequency of 4500 per./sec.

This frequency must be furthermore established much higher than the natural frequency of the apparatus. With these figures taken as example, a movement of a winding S or $S_1$ for a duration of 1/100 second still corresponds to 45 periods of the feed current.

These arrangements permit on the other hand the reduction to 0.2 grams, or thereabouts, of the weight of the complete movable sets.

The entire system, by means of which signal perforations on a perforated tape are converted into characteristic current impulses, transmitted, received, translated, and recorded, will now be described in detail.

In carrying out the present invention use is made of a perforator of the type employed for the perforation of the bands for the automatic transmission of Morse signals, by modifying however, as explained hereafter, the arrangement of the perforations and by feeding the paper in equal spaces, each letter or mark occupying here the same length on the band.

In addition to the regular median perforations necessary to feed the tape which comprise an uninterrupted succession of small holes, as shown in Fig. 1, each letter or mark comprises to one side of these perforations a hole of larger diameter. This hole is always perforated at the same place in the space corresponding to a letter. On the other side of the feed perforations are perforated large diameter holes to the number of 1, 2, 3 or 4 at the maximum, differently disposed amongst themselves and corresponding to the frequencies whose combinations are characteristic of the letter or mark to be transmitted.

The single large hole described above insures the suitable insertion of the band in the transmitters. In practice, if this perforated band is placed badly, the contact, usually arranged to be closed through this hole, would strike to one or the other side of the hole, and would encounter the insulating paper or take with the result that the transmission of the group of different frequencies, controlled by this contact, would not take place. The holes representative of the several frequencies are in fact regularly traversed by contacts connected to corresponding alternators, the combinations of the frequencies occurring naturally according to the arrangement of these holes relative to one another.

As in the type of perforator usual for the signals, which has only 40 keys to its keyboard, the machine insures the completion of the arrangement of the letters and marks by the successive taps of any two keys giving a new combination of the two perforations corresponding to each letter tapped.

This is accomplished by the blocking of the feeding device of the paper after the striking of the first key, this blocking arrangement being controlled by a lever directly operated prior to the lowering of this key; the first key is then abandoned and the lever and the second composition key is pressed down.

The transmitter, including the distributor by means of which the signal perforations on the tape are converted into characteristic electrical impulses, will now be described.

This apparatus consists of an assembly of three commutators 1C, 2C, 3C revolving in unison and driven by an electric motor M with speed reducer as illustrated in Figs. 2 and 13 for the purpose of obtaining different rotational speeds, from 80–160–240–320– revolutions per minute.

The first commutator 1C comprises a rotary contact distributing the current, furnished by an accumulator for instance, to a certain number of brushes 1T, disposed symmetrically on the circumference, for instance 12 in number, and connected to a same number of releasing electromagnets E of the "transmitters" as shown in Figure 13. The circuit of each magnet E is completed by way of line L through source B.

The second commutator 2C comprises a contact $ab$ of a length variable at will which collects successively the emissions transmitted by the twelve transmitters connected to twelve brushes 2T, arranged as in the preceding case in order to send the same in the outgoing line 3T.

The third commutator 3C finally comprises twelve rotary contacts connected continually to the outgoing line 3T and arranged to enter into action during the time between the sending of two successive emissions by the second commutator to collect the current delivered by the fixed brush 4T connected to the alternator of the synchronizing "tops" and deliver it to the line 3T.

In order to coordinate the moments where these different elements enter into action, the first commutator may be regulated in the manner that the releasing of the "transmitters" occur at a suitable moment before the passing of the contact of the second commutator under the corresponding brush. This contact of the second commutator has a trapezoidal surface $ab$ so as to allow the modification of the duration of the emission with respect to the duration of rest, by moving the collecting brushes parallel to the axis of rotation of the commutator.

The diameter of the commutators is such that for the speed of 240 revolutions per minute for instance, corresponding to 600 words per minute the durations of the operations are:

1. 1/10 of a second, about, for the energizing of the releasing electro-magnets E of the transmitters, 2. From 7.5/1000 to 13/1000 of a second for the emissions into the line 3T, 3. 6/1000 of a second for the emission of the synchronizing "tops" into 3T.

The driving motor M comprises, as shown in Fig. 13, a multi-stage speed reducer R, a speed governor and an adjusting rheostat $r$ for the terminal voltage for the purpose of obtaining as regular as possible running of the motor.

The purpose of the transmitter is to use the band perforated by the perforator to convert the signals into characteristic impulses by completing through the holes the contacts corresponding to the desired frequencies and transmitting them en bloc to the second transmitting commutator 2T described previously.

The arrangement of this apparatus insures the following functions:

1. Lifting the engaged band or tape in order to press the same against 6 fixed contacts connected to six alternators of different frequency whose combinations give the letters and against the control contact coupled to the second commutator of the transmitting distributor.

It will be understood that an alternative would consist in pressing the movable contacts against the fixed band, but the first arrangement is preferable from the mechanical point of view.

2. Return the band or tape to clear the contacts so as to free the contact so that the tape may be advanced by means of a comb already in the dispatching position and whose teeth have just engaged the center holes in the tape.

3. To prevent all untimely emission by the transmitter when no paper band or tape is engaged therewith or when the band in operation becomes exhausted.

The first two actions are effected by means of a cam and two levers with rollers the whole being set in motion through the release caused by the electromagnet controlled by the first commutator of the transmitting distributor.

The third action is obtained by two contacts, which are disposed one at the entrance, the other at the exit of the paper in the apparatus, and, when the band is engaged it acts as insulator between contacts.

During the contact of one or the other of these contacts, branched in parallel, the releasing electromagnet is short-circuited and the transmitter thus remains stationary. For the purpose of protecting the source of energy supplying these electromagnets, during the short-circuiting of the latter, there is disposed, in series with each of them, an additional fixed resistance suitably dimensioned.

There are as many transmitters as illustrated in Fig. 4 as brushes around each of the two first commutators of the transmitting distributor of Figs. 2 and 13, that is 12 in the case here in consideration. These transmitters are all driven by means of belts from a single transmission with a speed variable at will and driven by an electric motor with controlled speed which may for instance be the motor $M_1$ of the alternators with musical frequency.

The arrangement of one of the transmitters and its cooperation with the tape and keying means will now be described.

The movement of the tape relative to the contacts is controlled by a cam 25 divided, as shown in Figure 4, into four sectors as follows:

AOB where the track is near the center O and concentric along this sector; BOC where the track moves away from the center in order to join the track of sector COD which is furthest away from the center and concentric along this sector and finally DOA where the track nears the center again in order to join track AOB.

This track is engaged by a first roller 26 which controls by means of a horizontal lever 3 an articulated parallelogram 3, 4, 5 with axes fixed at 6 and 7 and whose extended side 4 supports a guide 8 which is engaged by the perforated paper band 9.

Two insulated contacts 10 and 11 short-circuit the electromagnet E by the body of guide 8 when no band is present, when it is poorly engaged or when it runs out.

Above guide 8 are the contacts 12 connected as shown in Fig. 13, to alternators $A_1$ to $A_6$ inclusive of different musical frequency, as well as the contact 13 for the emission of a control impulse. In the guide 8 is fitted a metal block 14, insulated electrically from 8, which acts as collector for all of the contacts 12 which have traversed the perforated band through the corresponding holes as well as for the emission control contact 13.

The track of cam 1 is also engaged by a second roller 15 which controls the vertical lever 16 pivoted at 17 and actuating by means of its free end the slide-comb 18 which engages a slot 19 of guide 8.

Cam 25 is integral with or driven by a disk 20 carrying a pawl 21 which is held by means of spring 22 against the ratchet wheel 23 turning with continuous speed and uniformly being driven by a motor of any kind as, for example, $M_1$ of Fig. 13. An electromagnet E controlled by the rotary contact F, first commutator of the transmitting distributor, from a battery G across a protecting resistance R releases the pawl 21 which, coming in contact with any one of the teeth of the revolving ratchet 23, moves the cam 1 in the direction of arrow $x$. At the end of a revolution, electromagnet E, already brought back to its return position by spring S, releases the pawl 21 and the cam stops in its position of rest. Accordingly, there takes place one signal energy emission per turn since the cam 25 has caused the tape 9 to be lifted against the brushes 12 and returned to normal position. By revolving the ratchet wheel 20 at a speed of 510 revolutions per minute, the duration of the emission of the transmitter will be 30/1000 of a second, when the transmitting distributor provides at the maximum for emissions of 13/1000 with the speed of 240 revolutions per minute corresponding to 600 words per minute. Hence, the safety factor is more than double.

In operation it is assumed that the cam 25 rotates in the direction of arrow $x$ and that the start is at the moment when the roller 26 is disposed on the radius OA. At this instant, the guide 8 has been brought to its lowest position. At this moment the roller 15 is on radius OB, the comb 18 is engaged at the very left in slot 19 and its teeth traverse the center perforations of the band 9. During the rotation in the direction of arrow $x$, the lever 3 is all the time stationary while roller 26 travels the track of sector AOB, while the lever 16 is moved back towards the right carrying with it the comb 18 and therefore band 9 for the length corresponding to a letter. Once these sectors are traversed, roller 15 in turn engages the sector COB which renders the comb immovable in its position to the right, while roller 2 which had entered the track of sector BOC is being lifted, moving the guide 8 towards the contacts 12 and 13 and disengaging at the same time the paper 9 from comb 18.

The roller 26 then travels over sector COD keeping guide 8 immovable in its high position while roller 15, entering in its turn the track of sector DOA returns the lever 16 towards the left, thus preparing the comb 18 for receiving the paper 9 during the descent of guide 8, and so forth.

The musical frequency generators or alternators and their cooperation with the transmitting apparatus described above will now be described in detail.

Each alternator with musical frequency comprises, as shown diagrammatically for purposes of illustration only in Fig. 13, a toothed rotor whereby the width of the teeth equals half the polar spacing of the grooving. This rotor turns between the legs of a permanent magnet on which several turns of insulated wire transform to alternating current the beats of the flux caused by the variation of the reluctance of the air gap produced by the passage of the teeth and the grooves between the legs of the magnet. Seven step-alternators $a_1$ to $a_7$ inclusive supply a frequency range of from 700 to 2200 periods per second for instance, for the signals and a frequency of 2500 per./sec. for the "tops" and are mounted on a common shaft CS driven by an electric motor $M_1$ with regulated speed and this with loose friction by magnetic coupling connection MC. A flywheel device FV cuts out the energizing of the coupling MC by opening the circuit including said winding with source G when the speed of the motor exceeds the allowable limit and reestablishes the same as soon as the speed of the group of rotors drops down to the lower limit.

The receiving apparatus, including the translator and associated circuits, will now be described.

As has been said in the general remarks, the translator has the purpose to translate into readable characters the frequencies and frequency combinations which make up the transmitted signals. This apparatus comprises two magnetic double circuits such as the assembly 31 and 32 of Fig. 5, disposed perpendicularly one above the other, each controlling a short-circuited wire of pure aluminum, one coil $S_1$ carries two mirrors $m_1$ and $m_2$ inclined 45°, and the coil S, carries a film F on which are microphotographed 48 letters and marks. A statement of the arrangement and operation of one of these closed coils will be sufficient to give a clear understanding of the invention since the operation and arrangement of both is the same.

The coil S moves horizontally in the air-gaps $e$ of the two magnetic circuits 31 and 32, guided by two horizontal trolley wires $t$ which are stretched through openings in bushing $r$ of hard material and pass over the threads of two screws $v$ which form the means for regulating the height and the warping of the trolley wires *t*. The mirrors are cemented on at *m* as shown in Fig. 7 and reflect the luminous rays such as *l*. The film *f* is placed as indicated as shown in Fig. 6 and carries in its center an opaque square, intercepting the luminous ray in the position of rest corresponding to each interval between the letters and to the stop of the emission.

The course which the luminous ray follows will be seen by inspection of Fig. 8.

At *a* there jumps a spark between suitably disposed electrodes. The spark is obtained and controlled by the receiving distributor in a manner which will appear more in detail hereinafter. The emitted rays are condensed by the concave mirror *mc* and the optic condenser C on the film *f*, having first been reflected on the oscillating mirror *m*1 carried by the coil S and then by the fixed prisms P1 and P2 in order to strongly illuminate the image of film *f*.

This image, reflected by the second mirror *m*2, oscillating in synchronism with mirror *m*1, is collected by objective O which photographs the same magnified, on the sensitive paper *pb* carried by the rotating cylinder *cy* after it is reflected by one of the turning prisms P3 and its passage through the aperture *e* which limits its contour. This has on the whole the effect to produce a fixed luminous pencil between *a* and *m*1, a movable one between *m*1 and *m*2 and again a fixed one between *m*2 and P3. When the mirror *m*1 moves it also moves the light ray which scans the prisms P1 and P2 in their longitudinal direction as well as the film *f* in a range at right angles to the direction of the movement of the latter, the mirror *m*2 collects the image, and the objective does the rest. The source *a* and the objective *o* are at a distance from the translator in order to reduce the changes in the illumination resulting from the variations of the distances *m*1—*a* and *m*2—*o* due to the movements of mirrors *m*1 and *m*2. The translator is provided with all the optic adjusting devices required to correct the inevitable deviations due to the construction.

The synchronous means at the receiver for producing a spark at *a* and distributing the several frequencies or frequency combinations will now be described.

Figure 9:
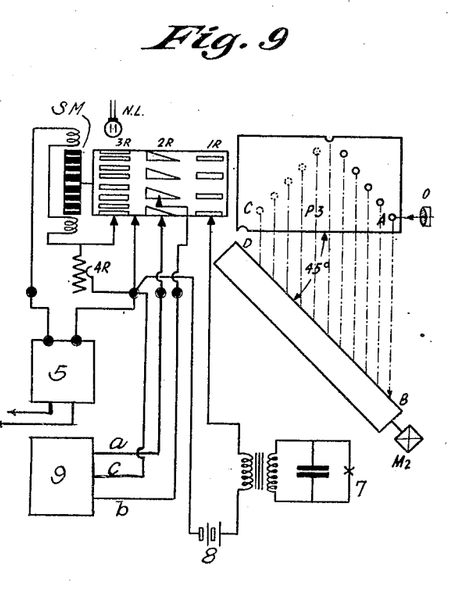
Figure 9 shows diagrammatically a synchronous distributor used at the receiver.

This apparatus consists of an assembly of three commutators coupled to a device comprising twelve prisms *p*3, helicoidally arranged, as shown in Fig. 9, the whole being driven by a synchronous motor SM with 24 corresponding fixed poles and a rotor with as many segments turning at the same speed as the transmitting distributor as described hereinbefore.

The function of these commutators is as follows:

The first commutator 1R controls, by special rupturing current, the sparking of the spark at *a* of Fig. 8 intended for the production of the light source for the photographic impression at the moment when the luminous pencil may impinge on the revolving prism. For this purpose it is provided with twelve contacts on which slide one or two brushes adjustable on the circumference.

The second commutator 2R controls the return of the movable sets of the translator to the intermediate position of equilibrium, as soon as the spark, that is soon as the photographic impression has taken place. The manner whereby the return is accomplished will be explained more in detail hereinafter. One embodiment consists in twelve contacts, triangular or trapezoidal of form, of the same type used with the transmitting distributor and on which may slide two brushes, adjustable circumferentially as well as parallel to the axis of rotation.

The third commutator 3R on which slides a fixed brush has the purpose to start the synchronous motor SM.

The dimensions of the contacts may be such that, for the normal speed of 240 revolutions per minute, corresponding to 600 words per minute:

—for the commutator 2, the duration of the return is adjustable from 8/1000 to 14/1000 of a second, the duration of the return then varying from 13/1000 to 7/1000 of a second;

—for the commutator 1, the duration of the establishment of a current reaches 18/1000 of a second and that of the cutting out, producing the extra-current is 3/1000 of a second.

The synchronous motor SM is fed by the synchronizing "tops" emitted by the transmitting distributor, rectified and amplified at 5 at the receiving end. In Figure 9, 5 indicates an amplifier for the synchronous pulses sent over from *a*7 of Figure 13. The stator is shifted by hand for adjusting the phase of the various actions to the desired value or, to be more explicit, to produce the jumping of the spark at 7 at the opportune moment that is when under the influence of the signals of the letters, the two movable sets of the translator have reached a given position of equilibrium.

For the starting of the operations, this motor is started like a repulsion motor by disconnecting and reconnecting again the supply current by means of commutator 3R previously mentioned.

A resistance 4R with sliding contact, branched between the fixed brush and the body of the commutator, is gradually reduced in proportion as the motor gains speed, being finally short-circuited at the moment of attaining synchronism, at the same time short-circuiting the brush and the commutator.

A neon lamp NL, illuminating the sections of the commutator finally furnishes the means, due to a stroboscopic effect, to control the synchronism and to observe the phase variations.

Fig. 9 shows the general diagram of the electric circuits which diagram is sufficiently explicit for the man trained in the art without the necessity to give a detailed description thereof.

The manner in which the characters or symbols impressed on the sensitive paper T of Figure 3 are developed will now be described.

In the description relative to Fig. 8 it was shown that the luminous letter projected by the objective of the translator is received on the sensitive paper $pb$ unrolling on drum $cy$ after its reflection by the revolving prisms P3 disposed helicoidally on a mounting which is part of the receiving distributor. It may be observed that the drum is inclined with respect to the axis of rotation of the prisms forming with the latter an angle of 45°. This has the purpose to maintain constant, for each prism in action, the distance between the center of the objective and the photographed image, thereby the courses OAB, OCD of Fig. 9 are easily rendered equal, as well as those corresponding to all other intermediate positions which the prisms assume in successive order in the line of the luminous pencil. This results in the further advantage to pick up a letter of square cross-section and to transform the same photographically imparting it a rectangular section of a height 1.414 times the width which facilitates the reading.

Figure 10:
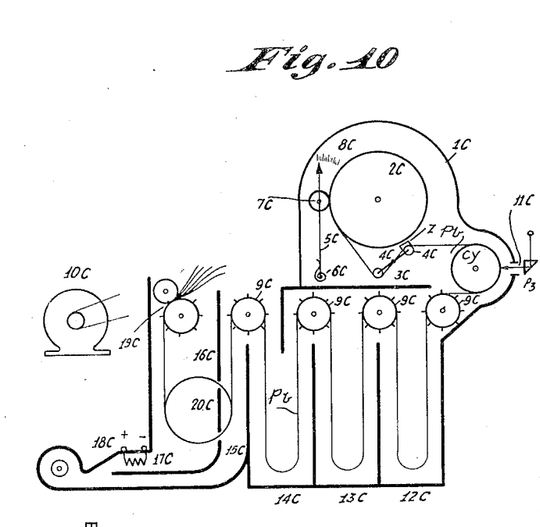
Figures 10 and 11 show details of the dark chamber for developing the film after being printed as shown in Figures 8 and 9.

The cylinder $cy$ carrying the sensitive paper $pb$ is enclosed as shown in Fig. 10 in a dark chamber 1C containing the supply reel 2C of the sensitive paper, perforated at its sides so as to regulate the uniform movement by means of sprockets provided with grippers.

A lever brake 3C, controlled by the paper engaging its rolls 4C stops the supply reel when the mechanical movement stops.

A lever 5C, pivoting in 6C, bears against the paper rolled on 2C by means of a roller 7C and indicates by a pointer and a graduated scale 8C, placed outside of chamber 1C, the stock of paper available at any time.

The loose cylinder $cy$ is imparted its rotation solely by the friction of the paper caught by the gripper sprockets such as 9C, being given a synchronous movement for instance by a single tangent screw driven by an electric motor 10C whose speed is adjustable at will.

After the paper is once placed in the apparatus, by means of an additional device and according to a method both of which will be described in due time, the motor is started. The paper is advanced with uniform motion by the driving sprockets whose grippers engage the lateral perforations. It may be seen at once that the traction on the paper moving over rollers 4C imparts oscillations to lever 3C in the sense of arrow $y$ and releases the shoe Z of the brake. The paper drives cylinder $cy$ by friction and the luminous letters arriving from the revolving prisms $p^3$ traverse the slot 11C and make an imprint at the passage of the paper over $cy$.

The paper is then caught by the grippers of sprockets 9C, and unwinds into a first developing bath 12C, then in a fixing bath 13C, and then in a washing bath 14C, with running water. The paper winds around cylinder 20C, located in a stove divided into two compartments. In the first compartment 15C, the liquid adhering to the paper is evaporated by a strong current of air, at room temperature, which strikes its surface.

In the second compartment 16C, the slightly wet paper is dried by a current of air heated to a suitable temperature by means of a resistance 17C traversed by electric current. A ventilator 18C, furnishes the necessary air. Attention is called to the fact that compartment 15C, has reduced dimensions relative to the passage of the paper in order to preserve as high a speed as possible to the air current while compartment 16C, must have large dimensions so as to maintain the heat on the paper, the air current being reduced to the one required for the evaporation of the humidity.

The paper thus dried is engaged by cutting disks or circular scissors 19C and thereby separated into a given number of bands corresponding to the different telegrams received and recorded. The assembly is driven by a motor 10C.

The charging of the sensitive paper must take place in the camera obscura and the manipulation thereof will now be set forth. In this statement reference will be made to Fig. 11.

Figure 11:
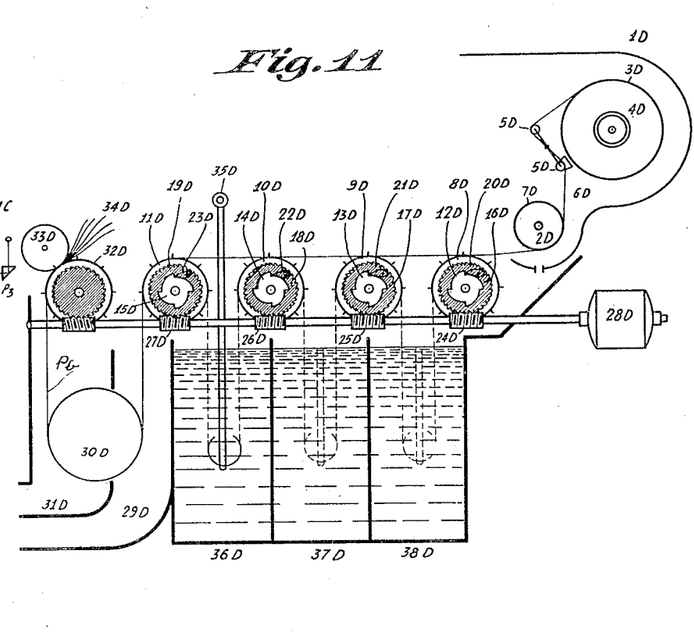

The dark chamber can be opened by pivoting around axle 2D of cylinder 7D.

The roll of sensitive paper 3D, which may have a starting part which is not sensitive for the first three meters for the purpose of starting the feeding movement, is placed in chamber 1D on axle 4D. The band is set on the two brake rollers 5D and around the idler 7D.

The paper is drawn out, reposing the same tangentially on the sprocket drums 8D, 9D, 10D, 11D which may turn freely, according to the direction of their ratchets 12D, 13D, 14D, 15D. These ratchets are rigidly mounted on the axes of the corresponding cylinders on which "idle" the toothed wheels 16D, 17D, 18D, 19D carrying pawls 20D, 21D, 22D, 23D and engaging the tangent screws 24D, 25D, 26D, 27D controlled by the variable speed motor 28D whose speed varies according to the cadence of the reception of the telegrams.

The paper is then lowered in the evaporating compartment 29D, wound around the idling drum 30D and raised again through drying compartment 31D, it then being placed between the disk drum, provided with sprockets, 32D and the circular knives 33D.

The motor 28D is started just long enough so that a few centimeters of the cut bands 34D can be torn off. When the motor is stopped again, the operation is as follows:

By means of a pusher 35D a loop of the paper is lowered in tub 36D containing running water. During this manipulation the cylinder 11D is rendered immovable by the pawl 23D integral with toothed wheel 19D which was locked by screw 27D at the stop.

Only cylinders 10D, 9D and 8D will turn freely and will allow the paper to unwind the length of the loop. The same operation is made for tub 37D containing the fixing liquid, the ratchet 14D held by the fixed pawl 22D prevents the cylinder 10D from moving backward, the paper is held on this side while it moves on the cylinders 9D and 8D, now alone released. The same is done for tub 38D containing the developing liquor. During all these operations, the cylinder 2D and supply sprocket 3D, released from its brake by the tension exerted on the paper, allowed the latter to unwind freely. All that is to be done now is to replace the dark chamber 1D in its operating position, by pivoting the same around axis 2D and the apparatus is thus ready to function in plain light.

It is now sufficient to start motor 28D, the endless screws engage the toothed wheels which, by the pawls, push the ratchets integral with the cylinders and the paper moves in uniform and regular manner.

Be it well understood that this arrangement contains compartments which are light-proof and removable tubs in order to effect the easy cleaning and refilling and that all the elements are arranged in accessible and demountable manner in order to facilitate their maintenance.

Figure 12:
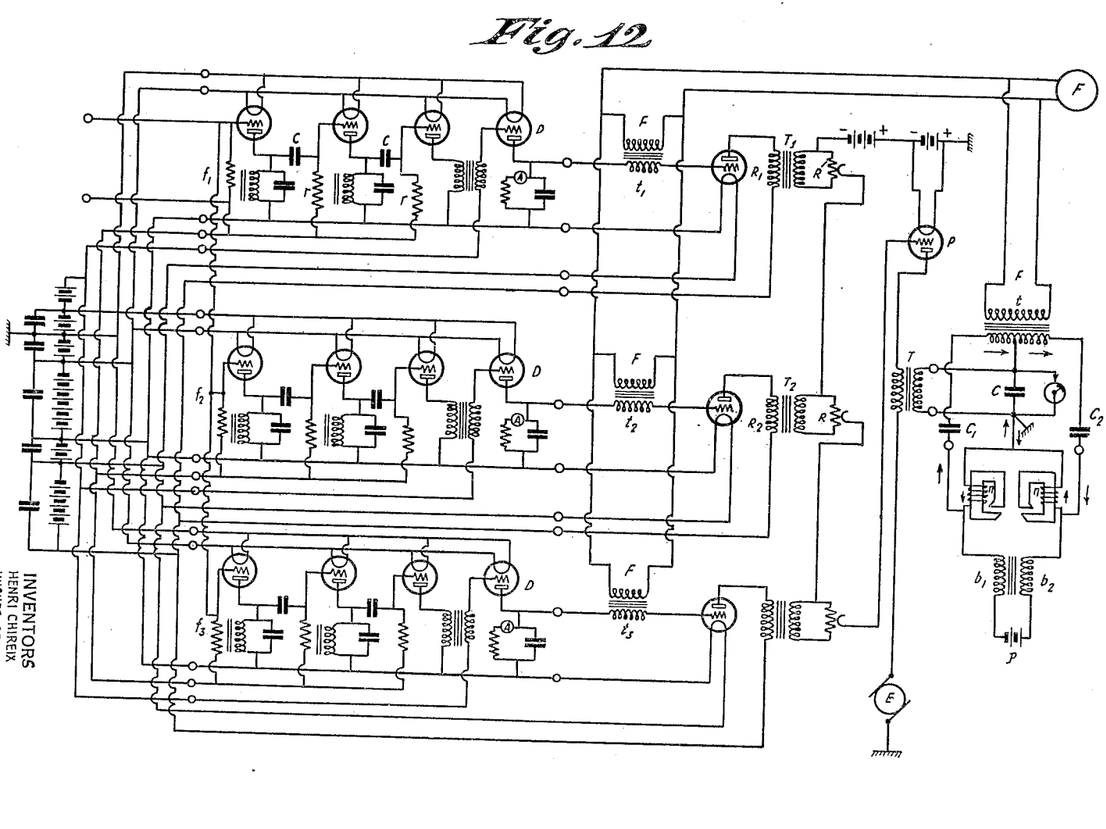
Figure 12 shows the arrangement of the circuit used at the receiver and the co-operation thereof with the novel translating device shown in Figure 5.

An embodiment of the selective electrical circuits, by means of which the signals as transmitted may be received, separated, and utilized to actuate and control the translator as illustrated in Figure 12, will now be given.

The electric diagram in Fig. 12 shows the assembly of the circuits which controls the translator shown in Figs. 5 and 8. Actually there are two identical translating assemblies similar to the one shown in Figure 5 and two circuit arrangements corresponding to the two sets of the translating apparatus.

A set may be actuated by three frequencies, there are first provided three amplifiers on the resonance principle numbered after the frequencies $f1, f2, f3$.

Each of these amplifiers comprises two stages with resonance for the frequencies to be received followed by a transformer stage and finally a detector D.

The signals influencing the selecting amplifiers result in the blocking of the plate current of three tubes R1, R2, R3, thereby preventing their amplification of the potentials coming from alternator F through the intermediary of transformers $t1, t2, t3$.

The plate circuits of tubes R1, R2, R3 are coupled to the grid circuit of a power tube P by means of transformers T1, T2, T3, shunted on potentiometers R. These potentiometers are provided for the purpose that in the absence of signals received by the amplifiers $f1, f2, f3$ the potentials developed in the grid circuit of the power tube P will for instance be +10 volt for T1, +20 volt for T2, −30 volt for T3, hence will total zero.

In this manner the following six possible combinations are realized:

+10 volts; +20 volts; +30 volts;
−10 volts; −20 volts; −30 volts;

these last three corresponding to the phase reversal.

These potentials then excite the grid circuit of tube P according to whether the frequencies $f1, f2, f3$ are received singly or in combination pair to pair.

It may further be seen that it will be sufficient to provide that the level of the signals blocking the tubes R1, R2, R3 will be above a certain base level in order that, beyond this latter, the final effect will be independent of their amplitude.

Finally, the resistances $r$ may be regulated in the manner to obtain the suitable value of the time constants of the resonant circuits.

Likewise, the circuit $cr$ may be adjusted in the manner to prolong the effect of the signal due to the slow discharge of $c$ into the resistance $r$.

The plate circuit of the power tube P is fed by a high-voltage direct current source E traversing the primary of a transformer T whose secondary is connected to the terminals of a condenser C, inserted in the equilibrizing circuit of a Wheatstone bridge which is balanced and whose four branches consist, on the one hand, of two coils, connected in series, of an element of the coupled translator so as to produce two fluxes of opposite direction and, on the other hand, of the two coils, connected in series, of the secondary of a transformer $T_4$ whose primary is fed by the alternator F already discussed.

In the absence of energy coming from T, the bridge is balanced and the translator occupies the center position of zero due to the quality of the two magnetic fluxes acting on the two opposite sides of the coil forming the movable set.

When, under the effect of the signals, a flow would appear in T, a differential current would be created, destroying the equilibrium of the Wheatstone bridge, which equilibrium is varied according to the intensity of the current and also according to whether it will be in phase or in opposed phase with the current supplied by T. The movable set will assume a new position of equilibrium either to the right, or to the left of the zero one previously defined.

$d$ finally represents the rotating contact of the second commutator of the receiving distributor 2R shown in Fig. 9.

At the closing of this contact, the energy coming from transformer T to the terminals of condenser C is short-circuited, the "bridge" thus balances and the movable set is immediately returned to its zero position.

Finally, the battery $p$ supplies to the windings $n$ the direct current for giving the desired damping flux to the set of the translator.

This direct current is blocked against transformer $t$ by the condensers C1 and C2; likewise, the alternating current of $t$ is blocked against battery $p$ by the blocking induction coils $b1$ and $b2$.

The elements T, $t'$, C, $C_1$ and $C_2$ at the right of Figure 12 are included in the unit 9 of Figure 9. In this unit points $a$ and $b$ are connected to the terminals of C and point $c$ is connected to ground.

It may be said with respect to the diagram (Fig. 12) that if the excitation of alternator F is increased in order to obtain an accelerated movement of the movable sets nothing is changed in the positions of equilibrium, since the potentials at the terminals of transformers $t1$, $t2$, $t3$, $T_4$ are increased in the same proportion.

The means for receiving, amplifying, and utilizing the "tops" or control pulses sent out from $a_7$ to control the synchronous driving motor for the receiving distributor will now be described.

It was shown hereinbefore that the "receiving distributor" is driven by a synchronous motor fed by the "tops" emitted during the intervals in the letters by the third revolving commutator of the "transmitting distributor" branched in the seventh alternator of the group discussed.

These "tops" are amplified and rectified at the arrival by a selective assembly such as $f1$ of Fig. 12, and, after detection, amplified by one or several power tubes which furnish the necessary addition of energy for the rotation of the synchronous motor driving the different elements of the receiving distributor.

*Sources of energy at the receiving end*

The feeding of the circuits will be accomplished in advantageous manner by means of the following sources:

—1 polarizing battery for the grids of the detector tubes of amplifiers $f1$, $f2$, $f3$ and of the tops.

—1 polarizing battery of the grids of amplifier tubes $f1$, $f2$, $f3$ and of the tops.

—1 heating battery for the amplifiers and detectors and the tops.

—1 plate battery for the amplifiers and detectors and the tops.

—1 heating battery for the relays R1, R2, R3.

—1 plate battery for relays R1, R2, R3.

—1 polarizing battery for the power tubes of the translator and the tops.

—1 generator F of 80 volts with 4500 per./sec.

—1 double generator, 12–1200 volts for the power tubes.

—1 battery for the damping circuit of the translator.

These various sources or batteries may be disposed as represented in Fig. 12.

Figure 14 shows the connections of the two symmetrical parts of the receiving set, as separately shown on Figure 12, and the synchronizing "tops" receiving apparatus.

In Figure 14 the receivers 1 and 1' each include all of the circuits and associated parts shown in Figure 12 at the left of the tube P. The output of each of these receivers is connected as shown through a tube P to a separate translating apparatus. The output circuit of receiver 1 may be connected as shown in Figure 14 through tube P and transformer T to a translator 3 which actuates a closed winding on which the mirrors are mounted. This translator has been described in detail in connection with Figure 12 and need not be described again at this point. The output circuit of receiver 1' may be connected through P' and transformer T' to a translator 3' which actuates the closed winding $S_1$ which carries the film $f$ on which the characters have been marked. This receiver and its connection with the translator has been described in detail hereinbefore. Equalizing current for the grid circuits of the translators 3 and 3' is provided from source F through transformer $t'$ and $t$ having secondaries connected with the magnet windings $n$ on the respective translators.

The receiver 5 includes a selective assembly such as shown at $f_1$ in Figure 12 to receive the "tops" which are detected and amplified by several amplifiers in the unit 5. These "tops" or synchronizing pulses amplified in 5 are finally fed to PO and through TO and are used for controlling the synchronous receiver motor SM carrying the commutator 1R. The commutator 1R controls at 7 the spark circuit by means of which the spark at $a$ of Figure 8 is generated, and also insures the restoration to zero of the translator systems S, $S_1$ immediately after the spark has been generated at $a$ by short-circuiting of the condensers C and C₁ shown at 2 and 2' in Figure 14.

The invention is subject to numerous variants, with respect for instance to the various particular forms which may be used for the construction of the elements or for accomplishing the functions for which they are intended, along the lines of modifications or simplifications of the described installations; in particular, although represented for the realization of multiplex telegraphy, the system is evidently applicable, without exceeding the scope of the invention, to the single message telegraphy by means of evident simplifications.

It should be understood that it is not limited by the dimensions, numerical values, nature of the materials indicated in the course of the description for the particular purpose of rendering the invention more tangible and to furnish positive and detailed means for the construction.

Certain of the improvements or particular elements, being a part of the means for the functioning, are in themselves new means or new industrial products and are subject to applications of varied nature in addition to those here specifically described.

We claim:—

1. The method of signaling including the step of converting symbols into energy impulses of equal length of several frequencies, the combination of the frequencies of each impulse being characteristic of a certain symbol.

2. In the method of signaling by converting distinct non-pictorial representations into energy impulses of equal length, the step which comprises converting each distinct representation into an electrical impulse of characteristic frequency combination value.

3. In the method of producing distinct pictorial representations from energy impulses of characteristic and different audible frequency combinations, the step which comprises reducing each of the impulses into pictorial representations characteristic of each of the frequency combinations of the respective impulses.

4. The method of signaling including the steps of converting symbols into distinct energy impulses of audible frequency current, the frequency combination of each impulse being characteristic of a certain symbol, and converting each of said energy impulses into distinct symbols characteristic of the frequency combination of the respective impulse.

5. The method of signaling including the steps of converting symbols into distinct energy impulses of like electrical length, the frequency combination of each impulse being characteristic of a certain symbol, transmitting said impulses, receiving said impulses and converting each of said energy impulses into distinct symbols, characteristic of the frequency combination of the respective impulse.

6. In the method of signaling with non-pictorial representations and energy impulses, the steps including converting each distinct representation into an electrical impulse of like length and of characteristic frequency combination value, and reducing each of the impulses into a pictorial representation, characteristic of the frequency combination of the impulse.

7. The method of signaling which includes the steps of converting distinct non-pictorial representations into energy impulses of different frequency combinations, transmitting said impulses, receiving said impulses, and converting each impulse into pictorial representation characteristic of the frequency combination of the respective impulse.

8. The method of signaling which includes the step of converting each distinct telegraphic representation into an energy impulse of non-characteristic duration, said impulse being formed as a group of alternating currents of several predetermined and characteristic frequencies, simultaneously transmitted.

9. The method of signaling which includes the step of covering each distinct telegraphic representation into an energy impulse of non-characteristic duration, said impulse being formed as a group of alternating currents of several predetermined and characteristic frequencies, simultaneously transmitted, the said alternating current impulse being divided in two parts, each of which being characteristic of a predetermined displacement of a moving element located at the receiver, the combination of these two predetermined displacements being characteristic of the telegraphic representation to be recorded.

10. The method of signaling which comprises the step of photographing by projection, at the receiving station, a certain telegraphic representation, on a type-table, said type-table being explored by means of a light beam, each relative displacement of the type-table with reference to the light beam being characteristic of a predetermined combination of the alternating current frequencies which are being received.

11. The method of signaling which comprises in combination the step of exploring, at the receiving station, a type-table, by means of the relative displacement of the said type-table with reference to a light beam, said relative displacement resulting, on the one part, of a displacement of the type-table and, on the other part, of a displacement of the light beam, each displacement being characteristic of part of an alternating current frequency combination which is being received, the step of adjusting, by acting on the mean value of a controlling alternative field, the natural frequency of each of the moving receiving parts controlling the displacement of, respectively, the type-table and the light beam; the step of adjusting, by acting on a direct current field superimposed on said alternating field, the damping of the said moving parts and the step of controlling, by means of the alternating current frequency combination which is being received, the balanced positions of the said moving parts, said positions being characteristic of the relation between the said controlling alternating fields.

12. The method of telegraphic multiplex signaling comprising, in combination, the step of converting each telegraphic symbol into a signaling energy impulse of a fixed duration and of a predetermined and characteristic audible frequency combination, the step of separating two consecutive alternating impulses by means of a synchronizing impulse and of sending, owing to such synchronization, each signaling energy impulse, in turn, on one of a number of different transmission channels.

13. The method of telegraphic multiplex signaling comprising selecting one of a number of types on a type-table, briefly illuminating the selected type, so as to project its representation and diverging the so obtained projection, so as to selectively impress it on a recording medium the position of which is characteristic of the transmission channel to which said representation belongs.

14. The method of telegraphic signaling comprising the steps of selecting a number of frequencies in arithmetic progression, of converting each telegraphic symbol into an energy impulse of a combination of some of said frequencies, of simultaneously transmitting the frequencies belonging to said combination and of selectively receiving the said frequency combinations in such a manner that, after electrical filtering and blocking, the selecting action be independent of the received energy of the impulses and dependent only on the frequency combination of said impulses.

15. In a multiplex telegraphic signaling system, a receiving station comprising, in combination, an electric spark generator, a type-table adapted to be partially and selectively illuminated by said spark, a sensitive film, a number of rotating optic devices between said spark generator and said sensitive film, means to selectively reproduce and fix the representation of the selected type on a part of said sensitive film, corresponding to the transmission channel to which the selected type belongs and means to automatically divide the imprinted tape along its length, into parts corresponding to each channel.

16. In a telegraphic signaling system, a transmitting station comprising, in combination, a number of audible frequency alternating current circuits, a perforated tape inserted in said circuits, a number of contact pieces located adjacent to the said tape, and connected with said audible frequency circuits, the contacting duration for each contact piece being of the same value, and the said contact pieces being adapted to bridge a gap in the circuit of the audible frequency circuits, said contacting combination being characteristic of the symbol to be transmitted.

17. In a telegraphic signaling system, a receiving station comprising, in combination, a type-table, a light beam, a projection photographic sensitive surface, said type-table and the controlling element of the light beam being carried on the moving coils of two respective electromagnetic receiving relays, with each two identical magnetic circuits, the natural frequency of the thus formed moving elements being adjustable by means of the mean value of the controlling alternating magnetic field, the damping of the same moving elements being adjustable by means of a direct current field superimposed on the said controlling magnetic fields and the balanced position of the said moving elements being adjustable by means of the relation between the alternating fields, on each of which is superimposed, through a push-pull arrangement, an additional alternating field, the value and phase of which are characteristic of frequency combinations to be received.

18. A translating device for converting electrical impulses of different frequencies into symbols including a Wheatstone bridge having a winding in each of a pair of adjacent arms each winding being associated with an electro-magnet to produce therewith a constant field, the other arms of said bridge including the secondary winding of a transformer the primary winding of which is connected to a source of energizing current, a closed winding symmetrically mounted for reciprocatory movement in the field of said electro-magnet, a shutter carried by said winding, a source of holding potential connected across one diagonal of said bridge circuit, a transformer having a secondary winding connected across the other diagonal of said bridge, and means associated with the primary of said transformer for impressing energy thereon, the amplitude of which is characteristic of the symbol to be converted.

19. A translating device as described above including two electro-magnets one of which carries a film having a plurality of symbols thereon and the other of which carries a plurality of mirrors.

20. A translating device for converting electrical impulses of different frequency into symbols including a shutter movable in a linear direction, a plurality of mirrors mounted on said shutter, a second shutter movable in a direction at right angles to said first named shutter, a film having symbols thereon carried by said last named shutter, a plurality of fixed prisms, a source of light mounted adjacent to said mirror carrying shutter, a lens for concentrating light from said source on one of said mirrors in all positions of said shutter, and means for moving each of said shutters a predetermined amount determined by the frequency of the impulse to be converted.

21. The method of signalling by telegraphy which includes the steps of converting each signal representation into an energy impulse of non-characteristic duration, the impulses being of distinct audible frequency characteristic of a symbol or the audible resultant of several audible frequencies combined at the transmitter, transmitting said impulses, receiving said impulses, and separating said distinct frequencies and said audible resultants.

HENRI CHIREIX.
HUGUES GOUDET.